(12) United States Patent
Flueck et al.

(10) Patent No.: US 6,496,757 B1
(45) Date of Patent: Dec. 17, 2002

(54) NONLINEAR CONTINGENCY SCREENING FOR VOLTAGE COLLAPSE

(75) Inventors: Alexander Joel Flueck, Chicago, IL (US); Jayabharath Reddy Dondeti, Bellevue, WA (US)

(73) Assignee: Illinois Institute of Technology, Chicago, IL (US)

( * ) Notice: Subject to any disclaimer, the term of this patent is extended or adjusted under 35 U.S.C. 154(b) by 0 days.

(21) Appl. No.: 09/364,670

(22) Filed: Jul. 30, 1999

(51) Int. Cl.⁷ .............................................. G05D 11/00
(52) U.S. Cl. ........................................ 700/292; 700/293
(58) Field of Search ................................ 700/292, 293, 700/295, 298

(56) References Cited

U.S. PATENT DOCUMENTS

| 4,974,140 A | 11/1990 | Iba et al. ........................ 363/74 |
| 5,566,085 A | 10/1996 | Marceau et al. ............. 700/293 |
| 5,594,659 A | 1/1997 | Schlueter ..................... 700/286 |
| 5,610,834 A | 3/1997 | Schlueter ..................... 700/293 |
| 5,642,000 A | 6/1997 | Jean-Jumeau et al. ........ 307/31 |
| 5,719,787 A | 2/1998 | Chiang et al. ............... 700/293 |
| 5,745,368 A | 4/1998 | Ejebe et al. ................. 702/164 |
| 5,796,628 A | 8/1998 | Chiang et al. .............. 700/295 |
| 6,219,591 B1 * | 4/2001 | Vu et al. ..................... 700/286 |
| 6,249,719 B1 * | 6/2001 | Vu et al. ..................... 700/292 |
| 6,313,752 B1 * | 11/2001 | Corrigan et al. ............ 340/657 |

OTHER PUBLICATIONS

Flueck et al.: *A Novel Two–stage Look Ahead Ranking Algorithm for Saddle–Node Bifurcation*, Proceedings of the 20$^{th}$ International Conference on Power Industry Computer Applications, 266–271, May 1997.

Greene et al.: *Sensitivity of the Loading Margin to Voltage Collapse With Respect to Arbitrary Parameters*, IEEE Transaction on Power Systems, 12(1):262–272, Feb. 1997.

* cited by examiner

Primary Examiner—Thomas Black
Assistant Examiner—Ronald D Hartman, Jr.
(74) Attorney, Agent, or Firm—Pauley Petersen Kinne & Erickson

(57) ABSTRACT

A method for estimating the severity of generator unit outage and multi-terminal branch outage contingencies with respect to voltage collapse in large-scale electric power systems which includes the steps of estimating a post-contingency saddle-node bifurcation induced voltage collapse point of an electric power system following a set of generator unit outages and/or a set of branch outages and calculating a distance to collapse of said power system. The post-contingency voltage collapse point is determined by application of a nonlinear contingency screening method.

10 Claims, 2 Drawing Sheets

Nonlinear Contingency Screening for Voltage Collapse

1. Given the normal case simple limit point $(x^*, \lambda^*, \mu^*=1)$ verify that it satisfie (Eqn. 2).
2. Compute right eigenvector $v$ and left eigenvector $\omega$
3. For $i \in C_{list}$,
   (a) Calculate $f_\mu$ for contingency $i$
   (b) Given $del\mu = -1$, initialize $delx$ to 0
   (c) Solve $\omega^T F_2(delx, del\lambda, -1) = 0$ for $del\lambda$ in terms of $delx$ and evaluate:
   $$del\lambda = \frac{1}{\omega^T \tilde{f}_\lambda}(\omega^T f_\mu - \omega^T \tilde{f}_x delx - \frac{1}{2}\omega^T \tilde{f}_{xx} delx delx)$$
   (d) Evaluate $F_2(delx, del\lambda, -1)$:
   $$F_2(delx, del\lambda, -1) = -f_\mu + \tilde{f}_\lambda del\lambda + \tilde{f}_x delx + \frac{1}{2}\tilde{f}_{xx} delx delx$$
   (e) While $\|F_2(delx, del\lambda, -1)\|_\infty > msmtol$ and $iter < maxiter$ do,
      i. Evaluate nonlinear sensitivity Jacobian $J(delx)$:
      $$J(delx) = -\tilde{f}_\lambda(\frac{1}{\omega^T \tilde{f}_\lambda})\omega^T \tilde{f}_x + \tilde{f}_x - \tilde{f}_\lambda(\frac{1}{\omega^T \tilde{f}_\lambda})\omega^T \tilde{f}_{xx} delx + \tilde{f}_{xx} delx$$
      ii. Solve nonlinear sensitivity system for Newton update:
      $$J(delx)\Delta delx = f_\mu - \tilde{f}_\lambda(\frac{\omega^T f_\mu}{\omega^T \tilde{f}_\lambda}) + \tilde{f}_\lambda(\frac{1}{\omega^T \tilde{f}_\lambda})\omega^T \tilde{f}_x delx - \tilde{f}_x delx$$
      $$+ \tilde{f}_\lambda(\frac{1}{2\omega^T \tilde{f}_\lambda})\omega^T \tilde{f}_{xx} delx delx - \frac{1}{2}\tilde{f}_{xx} delx delx$$
      iii. If $\|\Delta delx\|_2 > uptol$ or $\Delta del\lambda < 0$, exit loop
      iv. Evaluate $F_2(delx, del\lambda, -1)$
   (f) Estimate contingency bifurcation value:
      If Newton iterates converged,
      $\lambda_i^* = \lambda^* + del\lambda$
      Else,
      $\lambda_i^* = 0$
4. Rank contingencies based on estimated $\lambda_i^*$

FIG. 2

NONLINEAR CONTINGENCY SCREENING FOR VOLTAGE COLLAPSE

BACKGROUND OF THE INVENTION

1. Field of the Invention

This invention relates to an analytical and computational method for estimating the severity of generator unit outage and multi-terminal branch outage contingencies with respect to voltage collapse in large-scale electric power systems. The severity of a contingency is defined by the "distance to collapse" along a given transfer direction. More particularly, this method estimates how much stress, expressed in megawatts (MWs) and/or megavars (MVARs), a power system can handle before a widespread blackout occurs.

2. Description of Prior Art

Voltage collapse is a physical phenomenon found in electric power systems where voltage magnitudes decline rapidly, resulting in widespread disturbances. Voltage collapse has caused widespread blackouts in major metropolitan areas all over the world, for example Tokyo in 1987 and the entire Western System Coordinating Council (WSCC) region including San Francisco and Los Angeles in 1996. Thus, there is a need for a method to determine or estimate a point at which voltage collapse will occur.

U.S. Pat. No. 5,796,628 teaches a method for preventing voltage collapse in a power-generating system in which a performance index is calculated, which is directly correlated to load demands. The performance index is then used to identify weak areas in the power-generating system. A direct relationship between performance index and load demand enables assessment of the status of the power-generating grid system, in order to avoid a potential voltage collapse. Voltage profiles are generated to identify weak areas of the power-generating system, so that certain loads can be shed.

U.S. Pat. No. 5,745,368 teaches a method for analyzing voltage stability of low and high voltage applications in which two or more contingencies of a bulk power supply system are selected, screened and ranked based on a predetermined ranking algorithm. A voltage collapse index is generated and a stable branch of the bulk power supply system is approximated. A voltage versus power curve is created using a plurality of stable equilibrium points. An approximate voltage collapse point is then calculated.

U.S. Pat. No. 5,719,787 teaches on-line dynamic contingency screening of electric power systems. A sequence of contingency classifiers are used in a method for finding the controlling unstable equilibrium point of the power system, known as the boundary of stability region based controlling unstable equilibrium point method (the BCU method). Contingencies identified as definitely stable require no further analysis. Other contingencies classified as being unstable or undecided are applied to a time-domain simulation program to determine if the contingencies are unstable and require further action.

U.S. Pat. No. 4,974,140 teaches a voltage stability discriminating system for a power system in which a multiple load flow solution relating to a voltage stability discrimination is calculated for a power system. A pair of multiple load flow solutions are calculated and are closely located to each other with respect to the voltage stability discrimination for the power system.

U.S. Pat. No. 5,642,000 teaches a method for determining a performance index for power-generating systems, which are directly correlated to load demands. A performance index is used to assess the amount of load increase that a power-generating system can tolerate, prior to voltage collapse conditions. The performance index can also be used to assess whether the system can sustain a contingency without collapse.

U.S. Pat. No. 5,610,834 teaches a method for improving voltage stability security in a power transmission system that has a plurality of buses and a plurality of sources of reactive reserves coupled to the buses. A first voltage enhancement and a second voltage enhancement may include switchable shunt capacitors, synchronous voltage condensers, static var compensators or a combination of such devices. A third enhancement can include a series of capacitors, parallel lines, or a combination of series capacitors and parallel lines.

U.S. Pat. No. 5,594,659 teaches a method for performing voltage stability security assessment for a region of an electric power transmission system in which a multiple contingency analysis is performed for each of a plurality of reactive reserve basins, using single contingencies with a corresponding quantity that exceeds a predetermined threshold.

U.S. Pat. No. 5,566,085 teaches a stability transfer limit calculation for a power network having two or more independent alternating current generators that supply a common load over separate alternating current transmission lines.

Contingency screening is becoming more important in the new deregulated environment. As the electric power industry moves toward an open and competitive electric power market, the commercial success of the new market depends on accurate, up-to-date information. Open Access, one of the basic tenets of the deregulated power industry, allows all parties equal access to the transmission grid. As the number of energy transactions increases, so does the complexity of determining the capability of the transmission network.

To serve all parties equally, the Federal Energy Regulatory Commission (FERC) has mandated that all transmission owners must publicly declare the "Available Transfer Capability" (ATC) of their transmission facilities. ATC has been characterized by the North American Electric Reliability Council (NERC) as a measure of the transfer capability remaining in the physical transmission network for further commercial activity over and above already committed uses. ATC is defined as the Total Transfer Capability (TTC), less the Transmission Reliability Margin (TRM), less the sum of existing transmission commitments (which includes retail customer service) and the Capacity Benefit Margin (CBM).

Currently, the electric power industry has chosen to use a linear approximation technique for determining ATCs. In some cases, "MW proxies" are used to represent voltage and stability problems, but the proxies are only valid for a single operating point yet the power system evolves constantly due to event and loading disturbances. In special situations, a full nonlinear AC power flow simulation is used to back up the linear analysis. Since the nonlinear AC power flow techniques are computationally expensive, the faster linear techniques are used in many situations where nonlinear analysis should be used.

Contingency screening based on linear analysis is not sufficient for determining ATCs, but it is quick. The acceptance of a nonlinear tool would be swift if the tool could screen contingencies faster than it takes to run a full nonlinear AC power flow.

SUMMARY OF THE INVENTION

Accordingly, it is one object of this invention to provide a system having the ability to handle the nonlinearity in transfer capability while requiring less than the computation time of a single nonlinear AC power flow solution.

It is another object of this invention to provide a nonlinear system which is capable of screening contingencies faster than it takes to run a full nonlinear AC power flow.

These and other objects of this invention are addressed by a method for estimating the amount of stress, expressed in megawatts and/or megavars, a power system can handle before occurrence of a widespread blackout comprising the steps of estimating a voltage collapse point of said power system following a set of generator unit outages and/or a set of branch outages and calculating a distance to collapse of said power system. Voltage collapse in accordance with the method of this invention is determined by nonlinear contingency screening.

Nonlinear contingency screening is an analytical and computational method for estimating the severity of generator unit outage and multi-terminal branch outage contingencies with respect to voltage collapse in large-scale electric power systems. To determine the severity of generator unit outage and multi-terminal branch outage contingencies with respect to voltage collapse, the nonlinear contingency screening method estimates the (post-contingency) voltage collapse (saddle-node bifurcation) point of a large-scale power system following a generator unit outage or a branch outage. Once the post-contingency state has been estimated, then the "distance to collapse" can be determined. The critical step in determining contingency severity with respect to voltage collapse is the estimation of the post-contingency voltage collapse point of the power system. Nonlinear contingency screening in accordance with the method of this invention estimates the post-contingency voltage collapse point (saddle-node bifurcation point) quickly and accurately.

BRIEF DESCRIPTION OF THE DRAWINGS

These and other objects and features of this invention will be better understood from the following detailed description taken in conjunction with the drawings wherein:

FIG. 2 is a diagram showing the nonlinear contingency screening algorithm for voltage collapse in accordance with this invention.

DESCRIPTION OF PREFERRED EMBODIMENTS

Figure 1:
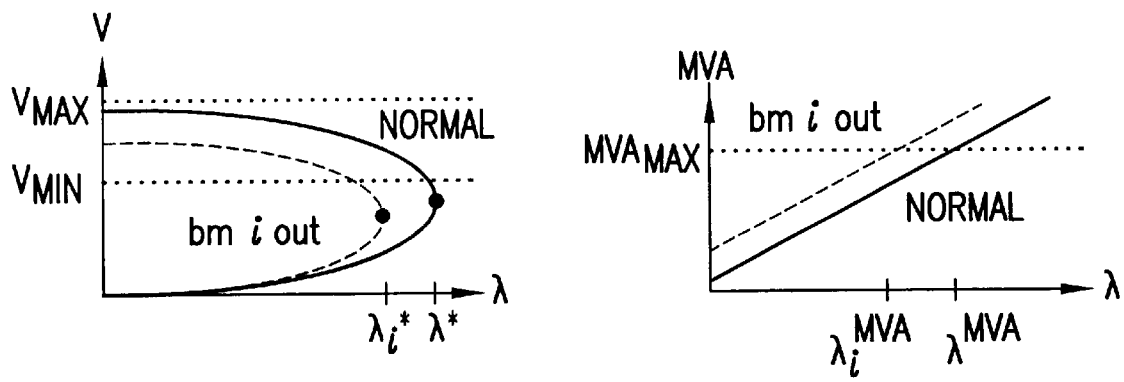
FIG. 1 is a diagram showing a contingency analysis for event disturbances.

The underlying nonlinear dynamical behavior associated with voltage collapse can be explained by the variation of an independent parameter leading to the loss of a stable equilibrium point via (i) saddle-node bifurcation, or (ii) subcritical Hopf bifurcation. The common element to both bifurcations is the disappearance of a stable equilibrium point combined with the absence of a local stable limit set. In other words, the power system state trajectory can no longer find a place to rest within the constraints of normal power system operation (e.g., branch MVA loading limits, voltage magnitude limits, system frequency limits). As soon as the trajectory violates an operating limit, the power system protection systems will begin tripping circuit breakers, eventually breaking the interconnected power system into smaller isolated systems called islands. While the disturbances could be caused by saddle-node bifurcation or subcritical Hopf bifurcation, the method of this invention is only concerned with screening for saddle-node bifurcation induced voltage collapse.

Saddle-node bifurcation is a qualitative change in the structural stability of a nonlinear system whereby a stable equilibrium point is annihilated by an unstable equilibrium point. However, it is possible to detect saddle-node bifurcation induced voltage collapse in power systems via the path-following continuation method for nonlinear systems. The standard assumption in power system analysis is that the well-known power flow equations adequately describe the bus voltage magnitudes $|V|$ and angles θ, although the stability cannot be determined directly from the power flow equations. The bus voltage magnitudes and angles are viewed as a projection of the (assumed stable) steady-state equilibrium point. To find the location of the saddle-node bifurcation point, one must follow the path of power flow solutions ($|V|$, θ) as an independent parameter λ varies (e.g., the power transfer increases) until the path "turns around" with respect to the independent parameter at a simple limit point. In power system operation, the objective is to avoid voltage collapse by limiting transfer capability to less than the estimated "distance to collapse," i.e., the distance to the simple limit point.

In studying transfer capability of electric power systems, the goal is to compute the maximum allowable transfer, within security constraints, while considering potential contingencies. The performance constraints for security studies fall into three categories:

1. Thermal constraints (branch MVA loading limits),
2. Voltage constraints (voltage magnitude limits), and
3. Stability constraints (voltage stability limits due to voltage collapse at a saddle-node bifurcation point, synchronous operation limits due to dynamic instability and transient instability).

Based on the stability assumptions that the base case power flow solution corresponds to a secure and stable equilibrium point of the nonlinear dynamical power system, that the power system has sufficient damping, and thus no Hopf bifurcations, and the system has a sufficiently large stability region, and thus it survives the transient period from one stable equilibrium point to another stable equilibrium point during a disturbance, then the only stability constraint that remains is voltage collapse at a saddle-node bifurcation point.

To see how these limits affect transfer capability, consider the following illustrative scenario. Let x represent the power system state variables ($|V|$, θ) and λ represent the "quantity" of transfer, i.e., a larger λ value means more power is transferred. Also, let ($x^*$, $λ^*$) represent the state variables and transfer parameter at the saddle-node bifurcation point, i.e., the limit point where the curve of power system states turns around with respect to λ.

In the case of an event disturbance (e.g., the loss of a single transmission branch), the location of the saddle-node bifurcation point may change. For example, losing a transmission branch i along a transfer corridor may cause the parallel path impedance to increase, which causes higher losses. In this case, the new saddle-node bifurcation point ($x_i^*$, $λ_i^*$) corresponding to the contingency (branch i out-of-service) may have a $λ_i^*$ value smaller than $λ^*$ (FIG. 1).

Likewise, a transmission branch outage can cause the loading of other branches to change. Using the same example, if transmission branch i is lost in a transfer corridor, then the other branches in parallel with the outaged branch typically will carry more power following the event disturbance. In this case, it is possible to reach an MVA overload at $\lambda_i^{MVA}$ earlier than it was encountered in the normal case at $\lambda^{MVA}$ (FIG. 1). Note that the maximum MVA rating in FIG. 1 remained the same under normal and abnormal conditions, in order to keep the illustration simple. However, the more general case enforces different MVA ratings for normal versus emergency operation.

The focus of the nonlinear contingency screening method of this invention is on estimating the post-contingency bifurcation point $(x_i^*, \lambda_i^*)$ for each contingency i in a given contingency list. Typically, the electric power industry analyzes thousands of potential contingencies over a range of operating conditions. Evaluating the nonlinear effects of each contingency takes significant computational effort, therefore motivating research in the area of fast and reliable contingency screening.

Mathematical Formulation

Let $F_{PF}(x, \lambda)$ represent the parameterized power flow functions:

$$F_{PF}(x, \lambda) = \begin{bmatrix} P(x) - P^{inj} \\ Q(x) - Q^{inj} \end{bmatrix} - \lambda b \quad (1)$$

where vector $x=(|V|, \theta)$ represents the state variables, and vector b represents the parameterized change in bus injections due to variations in generation dispatch and load demand. Mathematically, b is defined as follows:

$$b = \begin{bmatrix} P_{target}^{inj} - P^{inj} \\ Q_{target}^{inj} - Q^{inj} \end{bmatrix}$$

The single parameter $\lambda$ controls the amount of bus injection variation. When $\lambda=0$, the parameterized power flow functions represent the base case system. When $\lambda=1$, the parameterized power flow functions represent a new system with the target bus injections $(P_{target}^{inj}, Q_{target}^{inj})$.

Unconstrained maximum system loading and unconstrained maximum transfer capability are bounded by saddle-node bifurcation. The normal saddle-node bifurcation point $(x^*, \lambda^*)$ corresponds to the maximum value of the physical parameter $\lambda$ in the direction given by the parameterization vector b for the normal case where all transmission and generation facilities are in-service. In the case of an event disturbance (say the loss of a single generator unit), the location of the saddle-node bifurcation point may change, due to the change in generation dispatch.

The nonlinear contingency screening method of this invention models both branch outages and generator unit outages using a scalar parameter $\mu$. For example, in the case of a generator unit outage, $\mu$ will multiply the generator unit bus injections such that at $\mu=1$ the generator unit is in-service. However, by scaling $\mu$ to zero, the generator unit can be removed from service. The details are discussed hereinbelow under Generator Unit Outage Evaluation.

In the case of branch outages (single or multi-terminal), the contingency parameter $\mu$ scales branch admittances. When $\mu=1$, the set of branches in the branch contingency are in-service. However, when $\mu$ becomes zero, the branch admittances will be excluded from the branch admittance matrix such that the branches are removed from service. The details are discussed hereinbelow under Multi-terminal Branch Outage Evaluation. In this way, both generator unit outage and branch outage contingencies can be formulated mathematically.

Mathematical Description of the Bifurcation Point

The simple limit point (fold bifurcation point) of the parameterized power flow functions, corresponding to the saddle-node bifurcation induced voltage collapse point, can be expressed by a 2n+1 system of equations (Eqn. 2), where n represents the number of power flow equations (real equations plus reactive equations) that are binding at the simple limit point.

$$f(x, \lambda, \mu)=0 \quad f_x(x, \lambda, \mu)v=0 \quad v^T v - 1 = 0 \quad (2)$$

Note that n also represents the number of active state variables at the simple limit point. The simple limit point equations above include (i) the parameterized power flow equations, $f(x, \lambda, \mu)=0$ where $\lambda$ represents the transfer parameter and $\mu$ represents the contingency parameter, (ii) the right eigenvector equations, $f_x(x, \lambda, \mu)v=0$, where v is the right eigenvector corresponding to the zero eigenvalue of the Jacobian $f_x(x, \lambda, \mu)$ at the simple limit point, and (iii) the nonzero constraint on the right eigenvector $v^T v - 1 = 0$. The system of equations (Eqn. 2) describes the necessary conditions for a fold bifurcation of parameterized nonlinear algebraic functions. However, the sufficient condition can be verified visually if the curve reaches a turning point (not an inflection point) when the necessary conditions are satisfied.

The goal of the nonlinear contingency screening method is to estimate any change in the solution to the 2n+1 system as $\mu$ varies. There are many methods for computing the exact normal case (all facilities in-service) simple limit point and the nonlinear contingency screening method does not depend on the procedure used to determine the exact normal case simple limit point. Once the exact simple limit point has been computed, then the sensitivity of the simple limit point with respect to the contingency parameter $\mu$ can be evaluated. Next, the linear and nonlinear sensitivities of the simple limit point with respect to the contingency parameter $\mu$ will be derived.

To obtain the linear sensitivity information, expand the 2n+1 system by taking the first partial derivatives.

$$\begin{bmatrix} f_x(x, \lambda, \mu) & 0 & f_\lambda(x, \lambda, \mu) \\ f_{xx}(x, \lambda, \mu)v & f_x(x, \lambda, \mu) & 0 \\ 0 & 2v^T & 0 \end{bmatrix} \begin{bmatrix} \frac{\Delta x}{\Delta \mu} \\ \frac{\Delta v}{\Delta \mu} \\ \frac{\Delta \lambda}{\Delta \mu} \end{bmatrix} = \begin{bmatrix} -f_\mu(x, \lambda, \mu) \\ -f_{x\mu}(x, \lambda, \mu)v \\ 0 \end{bmatrix} \quad (3)$$

Note that the solution of (Eqn. 3) would provide linear sensitivity information for the state variables $\Delta x/\Delta \mu$, the right eigenvector $\Delta v/\Delta \mu$, and the transfer parameter $\Delta \lambda/\Delta \mu$. However, only the state variables and the transfer parameter are desired for estimating the new contingency limit point $(x_i^*, \lambda_i^*)$ for contingency i. Therefore, the next step will be to eliminate $\Delta v/\Delta \mu$ so that a simpler system of equations will yield only the desired linear sensitivity information.

To simplify the $(2n+1) \times (2n+1)$ matrix in (Eqn. 3), premultiply the middle row by the transpose of the left eigenvector w, corresponding to the zero eigenvalue at the simple limit point. This multiplication will eliminate the $\Delta v/\Delta \mu$ term since $w^T f_x(x, \lambda, \mu)=0$ at the simple limit point.

$$\begin{bmatrix} f_x(x, \lambda, \mu) & f_\lambda(x, \lambda, \mu) \\ \omega^T f_{xx}(x, \lambda, \mu)\nu & 0 \end{bmatrix} \begin{bmatrix} \frac{\Delta x}{\Delta \mu} \\ \frac{\Delta \lambda}{\Delta \mu} \end{bmatrix} = \begin{bmatrix} -f_\mu(x, \lambda, \mu) \\ -\omega^T f_{x\mu}(x, \lambda, \mu)\nu \end{bmatrix} \quad (4)$$

The n+1 system (Eqn. 4) can compute the linear sensitivity of both the power flow state variables and the transfer parameter with respect to a change in the contingency parameter $\mu$. The n+1 system also forms the basis for the linear screening technique and the "quadratic" improvement technique. Next, the foundation for nonlinear sensitivity is derived.

For a selected outage contingency (say, generator unit gr), the state (x, $\lambda$) will change as the power injection of generator unit gr changes. Furthermore, the parameterized real and reactive power flow functions establish a nonlinear relationship between the state (x, $\lambda$) and the contingency parameter $\mu$. However, note that the n+1 sensitivity system (Eqn. 4) only shows the linear sensitivity of the state variables x and the parameter $\lambda$ with respect to the contingency parameter $\mu$ at the simple limit point.

To approximate the nonlinear relationship between the bifurcation point (x*, $\lambda$*) and the contingency parameter $\mu$, consider the truncated Taylor series expansion of the first equation in (Eqn. 2) including second order terms:

$$F_2(x, \lambda, \mu) = f(x^*, \lambda^*, \mu^*)$$
$$+ f_x(x^*, \lambda^*, \mu^*)\Delta x$$
$$+ f_\lambda(x^*, \lambda^*, \mu^*)\Delta \lambda$$
$$+ f_\mu(x^*, \lambda^*, \mu^*)\Delta \mu$$
$$+ \tfrac{1}{2} f_{xx}(x^*, \lambda^*, \mu^*)\Delta x \Delta x$$
$$+ f_{x\lambda}(x^*, \lambda^*, \mu^*)\Delta x \Delta \lambda$$
$$+ f_{x\mu}(x^*, \lambda^*, \mu^*)\Delta x \Delta \mu$$
$$+ \tfrac{1}{2} f_{\lambda\lambda}(x^*, \lambda^*, \mu^*)\Delta \lambda \Delta \lambda$$
$$+ f_{\lambda\mu}(x^*, \lambda^*, \mu^*)\Delta \lambda \Delta \mu$$
$$+ \tfrac{1}{2} f_{\mu\mu}(x^*, \lambda^*, \mu^*)\Delta \mu \Delta \mu \quad (5)$$

where $\Delta x = x - x^*$, $\Delta \lambda = \lambda - \lambda^*$, and $\Delta \mu = \mu - \mu^*$. Since the bifurcation point (x*, $\lambda$*, $\mu$*) is a zero of the power flow functions, f(x*, $\lambda$*, $\mu$*)=0. Three other terms in (Eqn. 5) are zero: (i) $f_{x\lambda}(x, \lambda, \mu)$ is an n×n zero matrix since there is no x$\lambda$ crossterm, (ii) $f_{\lambda\lambda}(x, \lambda, \mu)$ is zero since $\lambda$ appears only linearly, and (iii) $f_{\mu\mu}(x, \lambda, \mu)$ is zero since $\mu$ appears only linearly.

Furthermore, based on the type of contingency (generator unit outage or branch outage) some other terms are zero. For generator unit outages, there is no x$\mu$ crossterm so $f_{x\mu}(x, \lambda, \mu)$=0. For branch outages, there is no $\lambda\mu$ crossterm so $f_{\lambda\mu}(x, \lambda, \mu)$=0.

Function $F_2(x, \lambda, \mu)$ defined by (Eqn. 5) can be extended to include higher order terms (e.g., $F_3(x, \lambda, \mu)$ would include third-order terms). The important aspect of (Eqn. 5) is that the state difference ($\Delta x$, $\Delta \lambda$) between the pre-contingency bifurcation point and the estimated post-contingency point is partially described by the nonlinear equation when $\mu$=0. To determine $\Delta x$ and $\Delta \lambda$, first solve for $\Delta \lambda$ in terms of $\Delta x$ from the following relationship.

$$w^T F_2(x, \lambda, 0) = 0 \quad (6)$$

With $\Delta \lambda$ expressed as a function of $\Delta x$, the Taylor series expansion (Eqn. 5) can be used to describe $\Delta x$ given a change in $\mu$ from 1 to 0 (i.e., $\Delta \mu = -1$). While this system is not the same as the 2n+1 system, (Eqn. 2), which describes a simple limit point, the n equations in (Eqn. 5) require a solution to satisfy the parameterized power flow equations. A zero of the parameterized power flow functions is sufficient for the purpose of estimating the "distance to collapse." The n equation nonlinear algebraic system (Eqn. 5) forms the basis for the nonlinear contingency screening method of this invention.

Linear sensitivity is a natural ranking index, based on both a pre-contingency parameter value (e.g., generator unit bus injection or branch admittance) and the sensitivity of the bifurcation value to changes in the parameter value. This index stems from the idea of evaluating a contingency via a single parameter homotopy. When the given parameter reaches zero, then the contingency has been taken (e.g., the generator unit has zero power injection or the branch admittances are zero). The first application of the sensitivity of the bifurcation value to generator injections and branch admittances was presented in Greene et al.

To compute linear sensitivity information for each contingency, the right hand side vector in (Eqn. 4) will change for each new generator unit or each new multi-terminal branch, but the left hand side matrix will not change. Note that the (n+1)×(n+1) matrix on the left hand side of (Eqn. 4) can be factored once at the normal case bifurcation point, and then the L and U factors can be used to solve for ($\Delta x/\Delta \mu$, $\Delta \lambda/\Delta \mu$) for each contingency.

While the $\Delta \lambda/\Delta \mu$ information is essentially free (i.e., a linear solve step is computationally insignificant compared to the repeated nonlinear solution steps), it can severely underestimate contingencies, as pointed out in Flueck et al., A novel two-stage look ahead ranking algorithm for saddle-node bifurcation, Proceedings of the 20th International Conference on Power Industry Computer Applications, Pages 266–271, May 1997. Poorly estimating severe contingencies produces ranking information that is inexpensive yet not worth using. However, in some cases, these ranking errors can be improved by the following "quadratic" improvement approach.

The first attempt at using second order sensitivity of the bifurcation value with respect to parameter variation was presented in Greene et al., "Sensitivity of the Loading Margin to Voltage Collapse With Respect to Arbitrary Parameters," IEEE Transaction on Power Systems, 12(1) :262–272, February 1997. However, the single second order update prescribed in Greene et al. does not satisfy the second order Taylor series expansion (Eqn. 5). Instead, the first order terms ($\Delta x/\Delta \mu$, $\Delta \lambda/\Delta \mu$) are used to compute a single update of $\Delta \lambda$. While that approach might improve upon the first order sensitivity estimate, it does not yield a solution to the second order Taylor series expansion. In fact, the single second order update may in some cases actually make the estimate worse.

First order sensitivity based screening is a natural approach to evaluating contingencies, but the relationship between a generator power injection (or a branch admittance) and a bifurcation value can be highly nonlinear. Nonlinear sensitivity based screening gives more accurate results, at a slightly higher cost, yielding a new powerful approach to screening generator outage contingencies and multi-terminal branch outage contingencies for voltage collapse.

The nonlinear contingency screening method is based on a second order (or higher order) Taylor series expansion of the parameterized power flow functions at the bifurcation point(x*, $\lambda$*, $\mu$*). The method actually solves the nonlinear Taylor series expansion for (Δx, Δλ) given Δμ=−1, i.e., μ goes from 1 to 0. While solving the nonlinear Taylor series expansion requires additional work, the extra computation yields high quality estimates of the contingency bifurcation values and a correspondingly good estimate of the exact ranking. The significant ranking errors encountered in the first order sensitivity approach and the "quadratic" improvement approach warrant the use of higher order methods.

The nonlinear contingency screening method for ranking single generator unit outage and multi-terminal branch outage contingencies with respect to saddle-node bifurcation is shown in FIG. 2. In this general representation, $\tilde{f}_x = f_x - f_{x\mu}$, $\tilde{f}_\lambda = f_\lambda - f_{\lambda\mu}$, $\tilde{f}_{xx} = f_{xx} - f_{xx\mu}$. Recall that for generator unit outages, $f_{x\mu}$ is a zero n×n matrix, and that for multi-terminal branch outages, $f_{\lambda\mu}$ is zero.

The key point is that the estimated state change information (Δx, Δλ) obtained at the normal case simple limit point should satisfy the second order Taylor series expansion. The nonlinear contingency screening method has proven to be both fast and accurate in estimating the post-contingency bifurcation value $\lambda_i^*$ due to generator unit outages and multi-terminal outages, as shown hereinbelow.

Nonlinear contingency screening has two key characteristics:
1. its speed, and
2. its accuracy.

While both characteristics are highly desirable, the novelty of the technique lies in the combination of its speed and accuracy. The nonlinear contingency screening method achieves its speed by estimating the nonlinear effects of a contingency rather than trying to find an exact zero of the nonlinear functions. The accuracy of the technique is due to the analytical foundation.

The brute force method for determining the "distance to collapse" would involve repeatedly solving the nonlinear algebraic equations representing the power system. A post-contingency power flow solution would be computed for each contingency. Then the power flow Jacobian would be checked for singularity. If the Jacobian were not singular, then a new post-contingency state would be chosen such that the system moved closer to the post-contingency bifurcation point.

The nonlinear contingency screening method of this invention eliminates the costly repeated power flow solutions required by the brute force method. Instead of solving for the exact post-contingency bifurcation point, the technique estimates the post-contingency bifurcation point.

The benefit of this methodology is speed. Since the computational effort of the nonlinear contingency screening method is on the order of one-half of the effort required by a power flow solution, the speed-up is in the neighborhood of an order of magnitude for a contingency evaluation that might otherwise require five power flow solutions.

The nonlinear contingency screening method is faster than solving the fall set of nonlinear equations for the exact solution. Moreover, the accuracy of the technique is better than the accuracy of the existing fast approximation techniques: look-ahead ranking, linear sensitivity screening, "quadratic" improvement, and MVA-based sensitivity. A comparison of the techniques is presented hereinbelow.

The nonlinear contingency screening method is primarily suited for determining the "distance to collapse" in a large-scale power system given a power transfer and a list of generator unit outage and branch outage (single or multi-terminal) contingencies. The method estimates the "distance to collapse" (i.e., the post-contingency bifurcation location in parameter space) for each contingency in the contingency list.

The nonlinear contingency screening method of this invention is designed to analyze the following contingency types:

1. Generator unit outages
   Analyze single unit outages or multiple unit outages.
   Distribute pick-up generation (to make up the outaged generation) among any set of generators.
2. Branch outages
   Analyze single branch outages or multi-terminal branch outages.
   Analyze load throw over contingencies where a set of circuit breakers are opened (tripped) and another set of breakers are closed.
   Analyze bus splits and joins where circuit breakers isolate or combine bus sections.

Generator Unit Outage Evaluation via Power Homotopy

Once a generator (say, generator unit gr) has been selected for contingency evaluation, a power injection homotopy can be constructed whereby the normal power system $F_{PF}(x, \lambda)$ corresponds to a new power system $f(x, \lambda, \mu)$ with $\mu=1$. Then as $\mu$ decreases toward zero, the complex power injection of generator unit gr decreases toward zero.

Recall, vector $x = (|V|, \theta)$ represents the state variables, and vector b represents the parameterized change in bus injections due to variations in generation dispatch and load demand. Suppose generator unit gr, connected to bus k, is to be removed for contingency analysis. Then, the new power flow functions, $f(x, \lambda, \mu)$, at bus k can be parameterized (via the generator unit gr complex power injection) by $\mu$ as follows:

$$f_{Pk}(x, \lambda, \mu) = |V_k|^2 G_{kk} + |V_k| \Sigma_{l \in C(k)} |V_l| [G_{kl} \cos(\theta_{kl}) + B_{kl} \sin(\theta_{kl})] - [P_{k_{new}}^{inj} + \lambda b_{new}^{Pk} + \mu(P_{k_{gr}}^{inj} + \lambda b_{gr}^{Pk})] \quad (7)$$

$$f_{Qk}(x, \lambda, \mu) = -|V_k|^2 B_{kk} + |V_k| \Sigma_{l \in C(k)} |V_l| [G_{kl} \sin(\theta_{kl}) - B_{kl} \cos(\theta_{kl})] - [Q_{k_{new}}^{inj} + \lambda b_{new}^{Qk} + \mu(Q_{k_{gr}}^{inj} + \lambda b_{gr}^{Qk})] \quad (8)$$

where $\pounds(k) = \{l: |Y_{kl}| \neq 0, l \neq k\}$ describes the set of buses that are directly connected to bus k through a transmission branch. The real power functions are labeled $f_{Pk}$ and the (imaginary portion) reactive power functions are labeled $f_{Qk}$. Here, $P_{k_{new}}^{inj} + jQ_{k_{new}}^{inj}$ represents the new kth bus base case complex power injection and $b_{new}^{Pk} + jb_{new}^{Qk}$ represents the new kth element of b, after generator unit gr has been removed from service. Generator unit gr contributions to bus k injections must be listed separately since multiple generator units may be injecting power into the same bus.

When $\mu=1$ the original set of power flow functions is obtained, and when $\mu=0$ a new set of power flow functions is obtained, which represents the network with generator unit gr removed. This formulation can be used to determine the sensitivity of a saddle-node bifurcation point with respect to generator unit outages.

Generator Unit Outage Contingency Screening

The method for ranking single generator unit outage contingencies with respect to saddle-node bifurcation induced voltage collapse is as follows:

1. Given a direction of loading/generation variation, obtain the normal case saddle-node bifurcation point.
2. Given a list of possible single generator unit outage contingencies, estimate the post-contingency saddle-node bifurcation value for each generator unit in the contingency list using the nonlinear contingency screening method.

3. Rank the single generator unit outage contingencies based on the estimated post-contingency saddle-node bifurcation values.

The nonlinear contingency screening method for ranking generator unit outages is shown in FIG. 2. Referring back to the expansion equation (Eqn. 5), the generator unit outage contingencies will have a nonzero $f_{\lambda\mu}(x, \lambda, \mu)$ term and a zero n×n $f_{x\mu}(x, \lambda, \mu)$ matrix.

Multi-terminal Branch Outage Evaluation via Admittance Homotopy

Once a branch (say, branch br) has been selected for contingency evaluation, an admittance homotopy can be constructed whereby the normal power system $F_{PF}(x, \lambda)$ corresponds to a new power system $f(x, \lambda, \mu)$ with $\mu=1$. Then as $\mu$ decreases toward zero, the admittance of branch br decreases toward zero.

Figure 3:
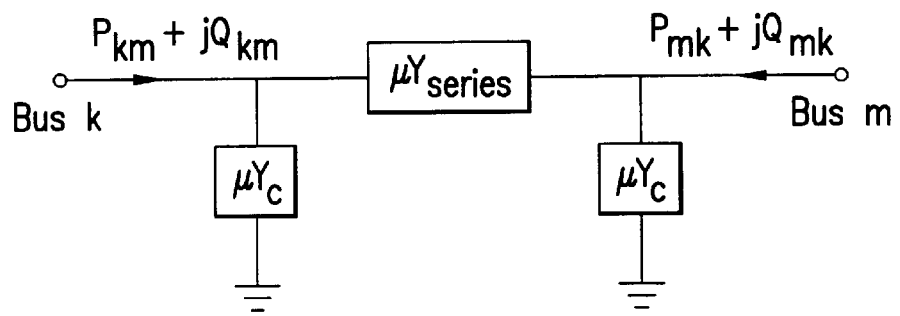
FIG. 3 is a diagram showing a branch connecting two buses.

Suppose branch br, connecting bus k to bus m, is to be removed for contingency analysis (FIG. 3). Then, the power flow equations, $f(x, \lambda, \mu)$, at bus k can be parameterized (via the branch br admittance) by $\mu$ as follows:

$$f_{Pk}(x, \lambda, \mu) = |V_k|^2 G_{kk}^{new} + |V_k| \Sigma$$

$$l \in C(k)_{l \neq n, |V_l|}[G_{kl} \cos(\theta_{kl}) + B_{kl} \sin(\theta$$

$$kl)] + |V_k||V_m|[G_{km}^{new} \cos(\theta_{km}) + B_{km}^{new} \sin(\theta$$

$$km)] + P_{km}(V_k, V_m, \mu) - [P_k^{inj} + \lambda b^{Pk}] \quad (9)$$

$$f_{Qk}(x, \lambda, \mu) = -|V_k|^2 B_{kk}^{new} + |V_k| \Sigma$$

$$l \in C(k)_{l \neq n |V_l|}[G_{kl} \sin(\theta_{kl}) - B_{kl} \cos(\theta$$

$$kl)] + |V_k||V_m|[G_{km}^{new} \sin(\theta_{km}) - B_{km}^{new} \cos(\theta$$

$$km)] + Q_{km}(V_k, V_m, \mu) - [Q_k^{inj} + \lambda b^{Qk}] \quad (10)$$

where $\pounds(k) = \{l: |Y_{kl}| \neq 0, l \neq k\}$ describes the set of buses that are directly connected to bus k through a transmission branch. Here, $G_{kk}^{new} + jB_{kk}^{new}$ represents the new kth diagonal element of $Y_{bus}$ and $G_{km}^{new} + jB_{km}^{new}$ represents the new (k,m) element of $Y_{bus}$ after branch br has been removed.

$$G_{km}^{new} + jB_{km}^{new} = G_{kk}^{old} + jB_{kk}^{old} - (G_{kk}^{br} + jB_{kk}^{br}) \quad (11)$$

$$G_{km}^{new} + jB_{km}^{new} = G_{km}^{old} + jB_{km}^{old} - (G_{km}^{br} + jB_{km}^{br}) \quad (12)$$

The real power flow, $P_{km}(V_k, V_m, \mu)$, and the reactive power flow, $Q_{km}(V_k, V_m, \mu)$, leaving bus k through branch br is defined simply as the branch flow scaled by $\mu$.

$$P_{km}(V_k, V_m, \mu) = \mu\{|V_k|^2 G_{kk}^{br} + |V_k||V$$

$$m|[G_{km}^{br} \cos(\theta_{km}) + B_{km}^{br} \sin(\theta_{km})]\} \quad (13)$$

$$Q_{km}(V_k, V_m, \mu) = \mu\{-|V_k|^2 B_{kk}^{br} + |V_k||V$$

$$m|[G_{km}^{br} \sin(\theta_{km}) - B_{km}^{br} \cos(\theta_{km})]\} \quad (14)$$

Note that the real and reactive branch flows still depend on the complex state variables $V_k$ and $V_m$. When $\mu=1$, the original set of power flow equations are obtained, and when $\mu=0$, a new set of power flow equations are obtained, which represent the network with branch br removed. This formulation can be used to determine the sensitivity of a saddle-node bifurcation point with respect to multi-terminal branch outages.

Multi-terminal Branch Outage Contingency Screening

The method for ranking multi-terminal branch outage contingencies with respect to saddle-node bifurcation induced voltage collapse is as follows:

1. Given a direction of loading/generation variation, obtain the normal case saddle-node bifurcation point.
2. Given a list of possible multi-terminal branch outage contingencies, estimate the post-contingency saddle-node bifurcation value for each contingency (branch set) in the contingency list using the nonlinear contingency screening method.
3. Rank the multi-terminal branch outage contingencies based on the estimated post-contingency saddle-node bifurcation values.

The nonlinear contingency screening method for ranking multi-terminal branch outages is shown in FIG. 2. Referring back to the expansion (Eqn. 5), the branch outage contingencies will have a sparse nonzero n×n $f_{x\mu}(x, \lambda, \mu)$ matrix and a zero $f_{\lambda\mu}(x, \lambda, \mu)$ term.

Voltage Magnitude Limit Violation Estimation

While the "distance to collapse" is the current focus, the nonlinear contingency screening method can also be used to estimate the entire post-contingency state of the power system. In particular, the voltage magnitudes at the bifurcation point have been estimated in the contingency screening process. For static security reasons, the voltage magnitudes are required to lie within certain limits. At the bifurcation point, the voltage magnitude limits are not checked since voltage collapse will break the system apart whether the voltage magnitudes are within their limits or not.

However, the voltage magnitude information may be useful. For example, if a voltage magnitude violates its limits before voltage collapse, then the system should not be operated any further along the transfer direction. In other words, the transfer should be limited due to the voltage magnitude limit violation before voltage collapse is a possibility. Since the path of (assumed stable) steady-state equilibria is continuous for the majority of buses (jump discontinuities occur only at buses connected to control devices with discrete settings), the voltage magnitudes at the bifurcation point yield some information about the voltage trajectories leading up to the bifurcation point.

We have found that every bus voltage magnitude trajectory can be estimated once (i) the normal case system trajectory, (ii) the estimated post-contingency bifurcation point, and (iii) the post-contingency base case solution are known.

Nonlinear Contingency Screening for Offline and Online Applications

The nonlinear contingency screening method can be applied to planning (offline) problems and to operational (online) problems. In the offline environment, the technique would be used to study postulated conditions in the future (e.g., what-if scenarios) or to analyze past problems (e.g., after-the-fact analysis of operator actions). The transfer directions would be based on predicted or historic transmission schedules. In the online environment, the technique would be used to study the current conditions and perhaps the short-term future conditions. The short-term transfer directions would be based on known or forecasted transmission reservations and schedules.

We have tested the nonlinear contingency screening method of this invention on a variety of actual data sets from electric power utilities. The results shown hereinbelow were derived from extensive testing on a model of the Mid-America Interconnected Network (MAIN). MAIN covers two-thirds of Wisconsin, a small piece of the upper peninsula of Michigan, all of Illinois, and the eastern third of Missouri. The data set was a five year Future System Study Group (FSSG) case built in 1996 to predict system behavior in 2001. This data set was chosen because it is publicly available from the Federal Energy Regulatory Commission (FERC). The FSSG01 case contained the following devices:

| Device | Quantity |
|---|---|
| Buses | 11,605 |
| Branches | 17,899 |
| Generators | 2,559 |
| Switched Shunts | 843 |
| ULTC Transformers | 1,332 |
| Areas | 32 |

The number of branches above included the ULTC transformers. The ULTC transformers included 22 phase shifters.

The FSSG01 case was stressed by importing power into the Wisconsin area due to increasing real (P) and reactive (Q) load demand. The increased load was fed by exporting power from control areas west of Wisconsin. The exporting control areas provided the extra real power P generation. The transfer direction can be expressed as a vector b of power injection modifications. The b vector contains (i) positive values in the positions associated with the exporting generators, (ii) negative values in the positions associated with the increased loads, and (iii) zeros elsewhere.

The transfer of power is ramped linearly via a continuation power flow algorithm. As the transfer is increased from the base case (no transfer) to the bifurcation point (maximum transfer before voltage collapse), the power flow equations are solved at each continuation step. Once the continuation algorithm finds the exact bifurcation point, the ranking algorithms can be applied.

A comparison of the linear sensitivity, "quadratic" sensitivity, and nonlinear sensitivity methods shows the following.

Multi-terminal Branch Outage Contingency Ranking Results

Table 1 shows the results for 60 branch outage contingencies. The unordered list of 60 contingencies came from a longer list of approximately 1300 contingencies that was cut down by a heuristic algorithm to the 60 most severe outages. The original list of 1300 contingencies is not available, so the screening tests were run on this list of the "top" 60. Of the 60 contingencies, more than two-thirds are multi-terminal branch outages.

TABLE 1

FSSG01 Branch Outage Contingency Ranking Results

| | Linear | | "Quadratic" | | Nonlinear | |
|---|---|---|---|---|---|---|
| Rank | Tran $\lambda_i^o$ | Rank | Prod $\lambda_i^o$ | Rank | Prod $\lambda_i^o$ | Rank | Prod $\lambda_i^o$ |
| 1 | 0.618241 | 1 | 0.758545 | 6 | 0.829926 | 5 | 0.639309 |
| 2 | 0.644211 | 30 | 0.825790 | 39 | 0.805451 | 2 | 0.000000 |
| 3 | 0.673075 | 2 | 0.761280 | 4 | 0.554930 | 6 | 0.680764 |
| 4 | 0.673165 | 9 | 0.792370 | 2 | 0.483003 | 7 | 0.684414 |
| 5 | 0.679889 | 10 | 0.793865 | 9 | 0.700653 | 11 | 0.894185 |
| 6 | 0.685605 | 11 | 0.794658 | 3 | 0.531576 | 9 | 0.692316 |
| 7 | 0.696509 | 3 | 0.762900 | 5 | 0.598897 | 8 | 0.692275 |
| 8 | 0.698440 | 14 | 0.798028 | 10 | 0.701127 | 12 | 0.712139 |
| 9 | 0.698440 | 15 | 0.798028 | 11 | 0.701127 | 13 | 0.712139 |
| 10 | 0.700565 | 4 | 0.763927 | 8 | 0.666173 | 10 | 0.692457 |
| 11 | 0.701854 | 32 | 0.827887 | 12 | 0.729985 | 16 | 0.736450 |
| 12 | 0.718146 | 13 | 0.797688 | 14 | 0.735214 | 15 | 0.735524 |
| 13 | 0.722687 | 20 | 0.806584 | 13 | 0.731175 | 18 | 0.739980 |
| 14 | 0.728868 | 7 | 0.790802 | 17 | 0.743118 | 17 | 0.736759 |
| 15 | 0.728683 | 21 | 0.807881 | 15 | 0.738843 | 14 | 0.735017 |
| 16 | 0.736190 | 36 | 0.830132 | 42 | 0.809909 | 3 | 0.000000 |
| 17 | 0.745340 | 16 | 0.798043 | 18 | 0.755222 | 20 | 0.754526 |
| 18 | 0.745941 | 41 | 0.835395 | 16 | 0.740905 | 19 | 0.751594 |
| 19 | 0.750869 | 19 | 0.802650 | 19 | 0.759027 | 21 | 0.759400 |
| 20 | 0.759569 | 17 | 0.799783 | 22 | 0.768420 | 24 | 0.789815 |
| 21 | 0.762397 | 42 | 0.836213 | 1 | 0.283220 | 22 | 0.763047 |
| 22 | 0.762734 | 34 | 0.828877 | 21 | 0.765625 | 26 | 0.774796 |
| 23 | 0.765710 | 43 | 0.836789 | 7 | 0.632476 | 23 | 0.767986 |
| 24 | 0.767043 | 8 | 0.792313 | 23 | 0.771982 | 25 | 0.771539 |
| 25 | 0.768272 | 23 | 0.816568 | 28 | 0.780078 | 27 | 0.776452 |
| 26 | 0.770054 | 5 | 0.787987 | 26 | 0.778709 | 28 | 0.776709 |
| 27 | 0.770628 | 22 | 0.814463 | 24 | 0.772926 | 29 | 0.778857 |
| 28 | 0.776547 | 35 | 0.829178 | 25 | 0.776473 | 30 | 0.781814 |
| 29 | 0.778533 | 6 | 0.790787 | 29 | 0.782925 | 31 | 0.782925 |
| 30 | 0.779914 | 18 | 0.801510 | 27 | 0.778393 | 1 | 0.000000 |
| 31 | 0.783704 | 33 | 0.828522 | 32 | 0.790699 | 33 | 0.786771 |
| 32 | 0.787526 | 12 | 0.796169 | 31 | 0.789230 | 35 | 0.789230 |
| 33 | 0.787902 | 26 | 0.822361 | 34 | 0.793163 | 36 | 0.791267 |
| 34 | 0.790288 | 39 | 0.832229 | 30 | 0.788179 | 37 | 0.792095 |
| 35 | 0.791877 | 29 | 0.823796 | 33 | 0.791906 | 34 | 0.787785 |
| 36 | 0.792367 | 48 | 0.839911 | 20 | 0.760211 | 32 | 0.783401 |
| 37 | 0.795106 | 27 | 0.822802 | 35 | 0.796501 | 38 | 0.794068 |
| 38 | 0.797575 | 38 | 0.831975 | 37 | 0.799878 | 39 | 0.798222 |
| 39 | 0.798385 | 31 | 0.825827 | 36 | 0.798591 | 40 | 0.799130 |
| 40 | 0.796618 | 52 | 0.842544 | 51 | 0.828043 | 4 | 0.000000 |

TABLE 1-continued

FSSG01 Branch Outage Contingency Ranking Results

| | | Linear | | "Quadratic" | | Nonlinear | |
|---|---|---|---|---|---|---|---|
| Rank | Tran $\lambda_i^o$ | Rank | Prod $\lambda_i^o$ | Rank | Prod $\lambda_i^o$ | Rank | Prod $\lambda_i^o$ |
| 41 | 0.799777 | 40 | 0.534269 | 40 | 0.806523 | 43 | 0.608289 |
| 42 | 0.803255 | 25 | 0.820871 | 38 | 0.805175 | 41 | 0.804017 |
| 43 | 0.806449 | 54 | 0.845083 | 53 | 0.835564 | 53 | 0.834679 |
| 44 | 0.806531 | 49 | 0.840412 | 44 | 0.813401 | 47 | 0.817380 |
| 45 | 0.808736 | 28 | 0.823160 | 43 | 0.811219 | 44 | 0.810436 |
| 46 | 0.809432 | 44 | 0.837056 | 45 | 0.813631 | 45 | 0.812284 |
| 47 | 0.810557 | 24 | 0.818123 | 41 | 0.809872 | 42 | 0.808032 |
| 48 | 0.013902 | 46 | 0.839312 | 49 | 0.825639 | 46 | 0.813902 |
| 49 | 0.618352 | 50 | 0.841489 | 46 | 0.824770 | 51 | 0.828299 |
| 50 | 0.819489 | 51 | 0.541534 | 48 | 0.825048 | 52 | 0.826596 |
| 51 | 0.823386 | 45 | 0.837786 | 52 | 0.826183 | 50 | 0.826183 |
| 52 | 0.824402 | 37 | 0.831699 | 47 | 0.824924 | 49 | 0.825956 |
| 53 | 0.627284 | 47 | 0.839394 | 50 | 0.825884 | 48 | 0.825740 |
| 54 | 0.641042 | 53 | 0.844528 | 54 | 0.838602 | 54 | 0.635566 |
| 55 | 0.847457 | 55 | 0.847357 | 56 | 0.848107 | 58 | 0.848107 |
| 56 | 0.647649 | 56 | 0.848493 | 58 | 0.848805 | 58 | 0.848588 |
| 57 | 0.647820 | 56 | 0.847947 | 55 | 0.847529 | 55 | 0.847525 |
| 58 | 0.847829 | 59 | 0.848505 | 59 | 0.848671 | 59 | 0.848667 |
| 59 | 0.649035 | 60 | 0.848901 | 60 | 0.849833 | 60 | 0.849824 |
| 60 | 0.848416 | 57 | 0.848446 | 57 | 0.848434 | 57 | 0.848417 |

The first column of Table 1 shows the true ranking of the contingencies based on column 2 which is the true "distance to collapse." Columns 3 and 4 show the predicted ranking of the contingencies based on the estimated "distance to collapse" obtained by linear sensitivity. The single second order update of the "quadratic" improvement technique was used to create columns 5 (ranking) and 6 (estimated "distance to collapse"). Columns 7 and 8 show the ranking and the estimated "distance to collapse" derived from use of the nonlinear contingency screening method. Each row of Table 1 refers to a single branch contingency, although the outage may involve multiple branch terminals. The important point is that by scanning any row, it is easy to see how each technique (linear, "quadratic" improvement, nonlinear) ranked the contingency based on the estimated "distance to collapse." Not only does the nonlinear contingency screening method do a better job of capturing the serious contingencies, for example #2, but the "distance to collapse" estimation errors are also smaller (when the algorithm converged) than the errors produced by the other methods.

Generator Unit Outage Contingency Ranking Results

Table 2 shows results for 60 generator unit outage contingencies. The list of 60 generator units came from a longer list of 112 generator units that was cut down by evaluating each contingency exactly and then limiting the list to the 60 most severe outages. The original list of 112 generator units was created by including all generator units in MAIN that had real power generation of at least 300 MWs.

TABLE 2

FSSG01 Generator Unit Outage Contingency Ranking Results

| | | Linear | | "Quadratic" | | Nonlinear | |
|---|---|---|---|---|---|---|---|
| Rank | Tran $\lambda_i^o$ | Rank | Prod $\lambda_i^o$ | Rank | Prod $\lambda_i^o$ | Rank | Prod $\lambda_i^o$ |
| 1 | 0.533979 | 1 | 0.591103 | 1 | 0.536162 | 2 | 0.531543 |
| 2 | 0.534280 | 2 | 0.591866 | 2 | 0.536683 | 3 | 0.531693 |
| 3 | 0.663288 | 3 | 0.710625 | 3 | 0.654669 | 4 | 0.649946 |
| 4 | 0.664580 | 4 | 0.712023 | 4 | 0.656344 | 5 | 0.652180 |
| 5 | 0.669034 | 21 | 0.792414 | 17 | 0.768625 | 1 | 0.000000 |
| 6 | 0.685395 | 5 | 0.720867 | 5 | 0.693626 | 6 | 0.689142 |
| 7 | 0.688095 | 6 | 0.721927 | 6 | 0.695942 | 7 | 0.891281 |
| 8 | 0.719911 | 7 | 0.750856 | 7 | 0.720167 | 8 | 0.713546 |
| 9 | 0.721306 | 10 | 0.754896 | 8 | 0.722109 | 9 | 0.715280 |
| 10 | 0.735820 | 11 | 0.761927 | 12 | 0.741277 | 13 | 0.736669 |
| 11 | 0.736311 | 12 | 0.762036 | 13 | 0.741360 | 12 | 0.738520 |
| 12 | 0.736557 | 13 | 0.765234 | 11 | 0.740466 | 14 | 0.740036 |
| 13 | 0.737532 | 8 | 0.752976 | 9 | 0.724022 | 10 | 0.720477 |
| 14 | 0.737716 | 9 | 0.753201 | 10 | 0.724531 | 11 | 0.720765 |
| 15 | 0.739853 | 18 | 0.777158 | 14 | 0.783297 | 15 | 0.763397 |
| 16 | 0.739987 | 17 | 0.777630 | 15 | 0.763942 | 16 | 0.764045 |
| 17 | 0.763340 | 15 | 0.776919 | 16 | 0.766862 | 17 | 0.765114 |
| 18 | 0.789851 | 14 | 0.776337 | 18 | 0.771807 | 19 | 0.771607 |
| 19 | 0.770005 | 19 | 0.784004 | 20 | 0.775167 | 20 | 0.775383 |
| 20 | 0.770998 | 18 | 0.781174 | 19 | 0.772450 | 18 | 0.771049 |

TABLE 2-continued

FSSG01 Generator Unit Outage Contingency Ranking Results

| | | Linear | | "Quadratic" | | Nonlinear | |
| --- | --- | --- | --- | --- | --- | --- | --- |
| Rank | Tran $\lambda_i°$ | Rank | Prod $\lambda_i°$ | Rank | Prod $\lambda_i°$ | Rank | Prod $\lambda_i°$ |
| 21 | 0.773706 | 49 | 0.829114 | 35 | 0.807082 | 37 | 0.808012 |
| 22 | 0.774015 | 51 | 0.829165 | 36 | 0.807317 | 39 | 0.808237 |
| 23 | 0.779764 | 20 | 0.785852 | 21 | 0.779597 | 21 | 0.778497 |
| 24 | 0.780441 | 24 | 0.795985 | 23 | 0.789466 | 24 | 0.789618 |
| 25 | 0.787203 | 23 | 0.795715 | 22 | 0.788496 | 22 | 0.786496 |
| 26 | 0.788538 | 26 | 0.796700 | 24 | 0.789551 | 23 | 0.789551 |
| 27 | 0.790348 | 28 | 0.805849 | 27 | 0.799811 | 27 | 0.799973 |
| 28 | 0.790724 | 25 | 0.796155 | 26 | 0.791780 | 26 | 0.791780 |
| 29 | 0.793458 | 60 | 0.832998 | 82 | 0.829012 | 82 | 0.829094 |
| 30 | 0.793885 | 22 | 0.794303 | 25 | 0.791588 | 25 | 0.791588 |
| 31 | 0.795304 | 50 | 0.829128 | 48 | 0.819696 | 48 | 0.819681 |
| 32 | 0.795839 | 36 | 0.812773 | 38 | 0.807473 | 32 | 0.803869 |
| 33 | 0.796425 | 31 | 0.809601 | 30 | 0.803511 | 31 | 0.802862 |
| 34 | 0.796943 | 61 | 0.833581 | 63 | 0.829999 | 63 | 0.829976 |
| 35 | 0.797112 | 30 | 0.808686 | 31 | 0.803867 | 30 | 0.802240 |
| 36 | 0.799515 | 29 | 0.807675 | 29 | 0.801050 | 29 | 0.800286 |
| 37 | 0.800553 | 27 | 0.804483 | 28 | 0.800598 | 29 | 0.800048 |
| 38 | 0.804893 | 32 | 0.810195 | 33 | 0.806554 | 35 | 0.808554 |
| 39 | 0.801841 | 52 | 0.829173 | 49 | 0.819785 | 49 | 0.819826 |
| 40 | 0.802325 | 33 | 0.810519 | 34 | 0.808869 | 34 | 0.808322 |
| 41 | 0.803095 | 35 | 0.810981 | 37 | 0.807393 | 36 | 0.806847 |
| 42 | 0.803447 | 40 | 0.817678 | 43 | 0.815004 | 43 | 0.815004 |
| 43 | 0.804196 | 34 | 0.810867 | 39 | 0.808017 | 38 | 0.809017 |
| 44 | 0.806180 | 37 | 0.813113 | 40 | 0.809998 | 40 | 0.809998 |
| 45 | 0.807976 | 46 | 0.824553 | 32 | 0.804817 | 33 | 0.804440 |
| 46 | 0.810438 | 38 | 0.816707 | 41 | 0.813241 | 41 | 0.813241 |
| 47 | 0.811271 | 64 | 0.838305 | 52 | 0.822233 | 52 | 0.822310 |
| 48 | 0.813033 | 42 | 0.821582 | 47 | 0.819612 | 47 | 0.819612 |
| 49 | 0.813234 | 65 | 0.838807 | 50 | 0.821937 | 54 | 0.822907 |
| 50 | 0.813927 | 41 | 0.819057 | 44 | 0.815688 | 44 | 0.615688 |
| 51 | 0.851397 | 39 | 0.817256 | 42 | 0.814694 | 42 | 0.814694 |
| 52 | 0.816665 | 44 | 0.824071 | 54 | 0.822484 | 53 | 0.822484 |
| 53 | 0.817891 | 47 | 0.825358 | 55 | 0.823853 | 55 | 0.823653 |
| 54 | 0.820544 | 62 | 0.834671 | 65 | 0.833502 | 65 | 0.833502 |
| 55 | 0.820577 | 63 | 0.837148 | 57 | 0.825587 | 56 | 0.824997 |
| 56 | 0.821088 | 45 | 0.824136 | 53 | 0.822244 | 51 | 0.822244 |
| 57 | 0.822776 | 43 | 0.823714 | 51 | 0.822101 | 50 | 0.822101 |
| 58 | 0.822795 | 48 | 0.827443 | 58 | 0.828031 | 59 | 0.826031 |
| 59 | 0.825885 | 55 | 0.829993 | 60 | 0.827698 | 60 | 0.827674 |
| 60 | 0.825928 | 58 | 0.832982 | 45 | 0.819201 | 45 | 0.819057 |

The first column of Table 2 shows the true ranking of the generator unit outage contingencies based on column 2 which is the true "distance to collapse." The true values were determined by a full run of the continuation power flow from base case (with the given generator unit out-of-service) to the contingency bifurcation point. The other columns of Table 2 follow the same structure found in Table 1. Columns 3 and 4 are based on the linear sensitivity technique. Columns 5 and 6 are based on the "quadratic" improvement technique. Columns 7 and 8 show the ranking and the estimated "distance to collapse" derived using the nonlinear contingency screening method.

As seen in the branch outage results, the nonlinear contingency screening method outperforms the other methods in terms of ranking accuracy and "distance to collapse" accuracy. In particular, the other methods (linear and "quadratic" improvement) miss the fifth most serious contingency. In fact, the fifth worst contingency is not picked up by the other methods within the predicted top 15 contingencies.

Nonlinear Contingency Screening Timing Statistics

The following timing statistics for the multi-terminal branch outage and generator unit outage contingency screening simulations were obtained on a 180 MHz PentiumPro PC running Linux 2.0.30. The normal case trace (a fixed "cost") took 1:59 (minutes:seconds). The normal case continuation trace computed twenty continuation power flow solutions at an average "cost" of 6.00 seconds per power flow solution.

For the multi-terminal branches, each branch outage contingency "distance to collapse" estimation (a variable "cost") took 3.00 seconds. This corresponds to half the time required to solve a single power flow. For the generator units, each generator unit outage contingency "distance to collapse" estimation (a variable "cost") took 2.54 seconds. This corresponds to slightly less than half the time required to solve a single power flow.

The nonlinear contingency screening method accurately ranks severe contingencies in less time than it would take to compute a full nonlinear AC power flow solution. Furthermore, a single power flow solution is unlikely to yield enough information to estimate the "distance to collapse." Without the guidance of the nonlinear contingency screening method, it would be extremely difficult to pick a $\lambda$ value that would lead to a power flow solution near the post-contingency bifurcation point $\lambda_i*$.

A brute force repeated power flow process is currently used by engineers in the industry. In many cases, a traditional power flow solution routine will not solve due to the ill-conditioning of the power flow Jacobian in the vicinity of the bifurcation point. Nonconvergence would force an engineer to shrink $\lambda$ and try again. On the other hand, if the power flow solution process converged to a solution, then the engineer would increase $\lambda$ and try again until the window between "converging" $\lambda$ values and "diverging" $\lambda$ values was sufficiently small. Suppose the brute force method settled on an estimate of the post-contingency $\lambda_i^*$ value after five power flow solutions. In comparison, the nonlinear contingency screening method of this invention could provide a more accurate estimate in one-tenth the time.

We claim:

1. A method for estimating the amount of stress, expressed in megawatts and/or megavars, a power system can handle before occurrence of a widespread blackout comprising the steps of:

obtaining a normal bifurcation point;

estimating, from the normal bifurcation point, a post-contingency voltage collapse point of said power system following one of a set of generator unit outages and a set of branch outages; and calculating a distance to collapse of said power system.

2. A method in accordance with claim 1, wherein said post-contingency voltage collapse point is determined by nonlinear contingency screening.

3. A method in accordance with claim 1, wherein said post-contingency voltage collapse point and said distance to collapse are determined online.

4. A method in accordance with claim 1, wherein said post-contingency voltage collapse point and said distance to collapse are determined offline.

5. A method for estimating the severity of generator unit outage and multi-terminal branch outage contingencies with respect to voltage collapse in large-scale electric power systems comprising the steps of:

obtaining a normal bifurcation point;

estimating, from the normal bifurcation point, a post-contingency saddle-node bifurcation point of an electric power system following one of a set of generator unit outages and a set of branch outages; and calculating a distance to collapse of said power system.

6. A method in accordance with claim 5, wherein said post-contingency saddle-node bifurcation point is determined by nonlinear contingency screening.

7. A method for estimating the severity of generator unit outage and multi-terminal branch outage contingencies with respect to voltage collapse in large-scale electric power systems comprising the steps of:

obtaining a normal bifurcation point;

deriving nonlinear sensitivities of the normal bifurcation point with respect to a contingency parameter; and estimating, via the nonlinear sensitivities of the normal bifurcation point, a post-contingency bifurcation point for each contingency in a given contingency list.

8. A method in accordance with claim 7, wherein a second or higher order Taylor series expansion of parameterized power flow functions is used at the bifurcation point.

9. A method in accordance with claim 7, wherein said post-contingency voltage collapse point and said distance to collapse are determined online.

10. A method in accordance with claim 7, wherein said post-contingency voltage collapse point and said distance to collapse are determined offline.

* * * * *